United States Patent
Graves et al.

(10) Patent No.: US 10,691,997 B2
(45) Date of Patent: Jun. 23, 2020

(54) AUGMENTING NEURAL NETWORKS TO GENERATE ADDITIONAL OUTPUTS

(71) Applicant: DeepMind Technologies Limited, London (GB)

(72) Inventors: Alexander Benjamin Graves, London (GB); Ivo Danihelka, London (GB); Gregory Duncan Wayne, London (GB)

(73) Assignee: DeepMind Technologies Limited, London (GB)

( * ) Notice: Subject to any disclaimer, the term of this patent is extended or adjusted under 35 U.S.C. 154(b) by 1042 days.

(21) Appl. No.: 14/977,201

(22) Filed: Dec. 21, 2015

(65) Prior Publication Data
US 2016/0189027 A1    Jun. 30, 2016

Related U.S. Application Data

(60) Provisional application No. 62/096,716, filed on Dec. 24, 2014.

(51) Int. Cl.
| | | |
|---|---|---|
| *G06N 3/08* | (2006.01) | |
| *G06N 3/04* | (2006.01) | |
| *G06N 3/063* | (2006.01) | |

(52) U.S. Cl.
CPC ............. *G06N 3/08* (2013.01); *G06N 3/0454* (2013.01); *G06N 3/063* (2013.01)

(58) Field of Classification Search
CPC ........ G05B 1/03; G05B 13/00; G05B 13/027; G05B 15/02; G05B 19/0423;
(Continued)

(56) References Cited

U.S. PATENT DOCUMENTS

| | | | | |
|---|---|---|---|---|
| 4,951,239 A | * | 8/1990 | Andes ................... | G06N 3/063 708/801 |
| 5,479,576 A | * | 12/1995 | Watanabe ............ | G06N 3/0472 706/25 |

(Continued)

OTHER PUBLICATIONS

John Bullinaria, "Step by Step Guide to Implementing a Neural Network in C", Nov. 18, 2002, School of Computer Science of the University of Birmingham, UK (Year: 2002).*

(Continued)

*Primary Examiner* — Kamran Afshar
*Assistant Examiner* — Ying Yu Chen
(74) *Attorney, Agent, or Firm* — Fish & Richardson P.C.

(57) ABSTRACT

Methods, systems, and apparatus, including computer programs encoded on computer storage media, for augmenting neural networks to generate additional outputs. One of the systems includes a neural network and a sequence processing subsystem, wherein the sequence processing subsystem is configured to perform operations comprising, for each of the system inputs in a sequence of system inputs: receiving the system input; generating an initial neural network input from the system input; causing the neural network to process the initial neural network input to generate an initial neural network output for the system input; and determining, from a first portion of the initial neural network output for the system input, whether or not to cause the neural network to generate one or more additional neural network outputs for the system input.

24 Claims, 3 Drawing Sheets

(58) Field of Classification Search
CPC .... G05B 19/045; G05B 19/054; G05B 24/02; G06F 3/00; G06F 7/023; G06F 7/76; G06F 15/18; G06N 3/02; G06N 7/046; G06N 99/005; G06N 3/08; G06N 3/0454; G06N 3/063
See application file for complete search history.

(56) References Cited

U.S. PATENT DOCUMENTS

| | | | | |
|---|---|---|---|---|
| 5,913,194 | A * | 6/1999 | Karaali | G10L 13/02 704/259 |
| 5,999,638 | A * | 12/1999 | Takeo | G06T 5/009 250/581 |
| 2012/0183187 | A1 * | 7/2012 | Sasaki | G06T 7/0012 382/128 |

OTHER PUBLICATIONS

Andrej Karpathy, "The Unreasonable Effectiveness of Recurrent Neural Networks", May 21, 2015, Github (Year: 2015).*
Daren Yu, Qinghua Hu, and Wen Bao, "Combining Multiple Neural Networks for Classification Based on Rough Set Reduction", Dec. 14-17, 2003, IEEE Int. Conf. Neural Networks & Signal Processing Nanjing, China, pp. 543-548 (Year: 2003).*
Joachim Utans, "Weight Averaging for Neural Networks and Local Resampling Schemes", Feb. 1, 2002, London Business School (Year: 2002).*
Michael L. Seltzer and Jasha Droppo, "Multi-Task Learning in Deep Neural Networks for Improved Phoneme Recognition", May 2013, 2013 IEEE International Conference on Acoustics, Speech and Signal Processing, pp. 6965-6969. (Year: 2013).*
Pedro O. Pinheiro and Ronan Collobert,"Recurrent Convolutional Neural Networks for Scene Labeling", Jun. 2014, Proceedings of the 31 st International Conference on Machine Learning, Beijing, China, 2014. JMLR: W&CP vol. 32. pp. 1-9. (Year: 2014).*
Karol Gregor, Andriy Mnih, and Daan Wierstra. "Deep AutoRegressive Networks", Oct. 31, 2013, arXiv, pp. 1-9. (Year: 2013).*
International Preliminary Report on Patentability issued in International Application No. PCT/US2015/067159, dated Jun. 27, 2017, 7 pages.
Das et al., "Learning Context-free Grammars. Capabilities and Limitations of a Recurrent Neural Network with an External Stack Memory," Advances in Neural Information Processing Systems 5, Jan. 1, 1993, 6 pages, XP055239425.
Graves et al., "Speech recognition with deep recurrent neural networks," 2013 IEEE International Conference on Acoustics, Speech and Signal Processing (ICASSP); Vancouver, BC; May 26-31, 2013, Institute of Electrical and Electronics Engineers, Piscataway, NJ, US, May 26, 2013 (May 26, 2013), pp. 6645-6649, XP032508511.
Graves, "Generating Sequences with Recurrent Neural Networks," arXiv:1308.0850v1 [cs.NE], Aug. 4, 2013, pp. 1-43, XP055227715.
Graves, "Sequence Transduction with Recurrent Neural Networks," arXiv:1211.3711v1 [cs.NE], Nov. 14, 2012, pp. 1-9, XP055247437.
Gregor et al., "Deep AutoRegressive Networks," arXiv:1310.8499v2 [cs.LG], May 20, 2014, pp. 1-9, XP055261759.
International Search Report and Written Opinion in International Application No. PCT/US2015/067159, dated Apr. 12, 2016, 13 pages.
Joulin et al., "Inferring Algorithmic Patterns with Stack-Augmented Recurrent Nets," arXiv:1503.01007v4 [cs.NE], Jun. 1, 2015, pp. 1-10, XP055239416.
Bengio et al., "A neural probabilistic language model," The Journal of Machine Learning Research, vol. 3, pp. 1137-1155, Mar. 2003.
Graves et al., "Neural Turing Machines," arXiv:1410.5401v2 [cs.NE], Dec. 2014, pp. 1-26.
Martens and Sutskever, "Learning Recurrent Neural Networks with Hessian-Free Optimization," Proceedings of the 28th International Conference on Machine Learning, pp. 1033-1020, 2011.
CN Office Action in Chinese Appln. No. 201580034576.2, dated Mar. 1, 2019, 9 pages (with English translation).
U.S. Appl. No. 14/885,086, filed Oct. 16, 2015, Graves et al.
U.S. Appl. No. 62/064,965, filed Oct. 16, 2014, Graves et al.
CN Office Action in Chinese Appln. No. 201580034576.2, dated Aug. 8, 2019, 8 pages.
CN Office Action in Chinese Appln. No. 201580034576.2, dated Jan. 21, 2020, 13 pages. (with English translation).

* cited by examiner

AUGMENTING NEURAL NETWORKS TO GENERATE ADDITIONAL OUTPUTS

CROSS-REFERENCE TO RELATED APPLICATION

This application claims priority to U.S. Provisional Application No. 62/096,716, filed on Dec. 24, 2014. The disclosure of the prior application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems. In general, an augmented neural network system includes a neural network configured to receive neural network inputs and generate a respective neural network output for each neural network input. The augmented neural network system also includes a sequence processing subsystem that is configured to, for each of the system inputs in a sequence of system inputs, receive the system input and generate an initial neural network input from the system input. The sequence processing subsystem is also configured to cause the neural network to process the initial neural network input to generate an initial neural network output for the system input and to determine, from a first portion of the initial neural network output for the system input, whether or not to cause the neural network to generate one or more additional neural network outputs for the system input.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By allowing an augmented neural network system to determine when a final system output has been generated for a given system input, the performance of the neural network can be improved by allowing the neural network to generate more accurate outputs for difficult inputs. Additionally, the performance of the neural network is improved without significant increases in processing time needed for or computing resources used by the neural network, either during training or, after training, at run time. Additionally, the augmented neural network system is configured to signal when the output generated by the system is the final system output. By doing this, the system can be given time to accurately produce more complicated system outputs, e.g., to ensure that incomplete variable length outputs are not sent for further processing while still incomplete, improving the performance of the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
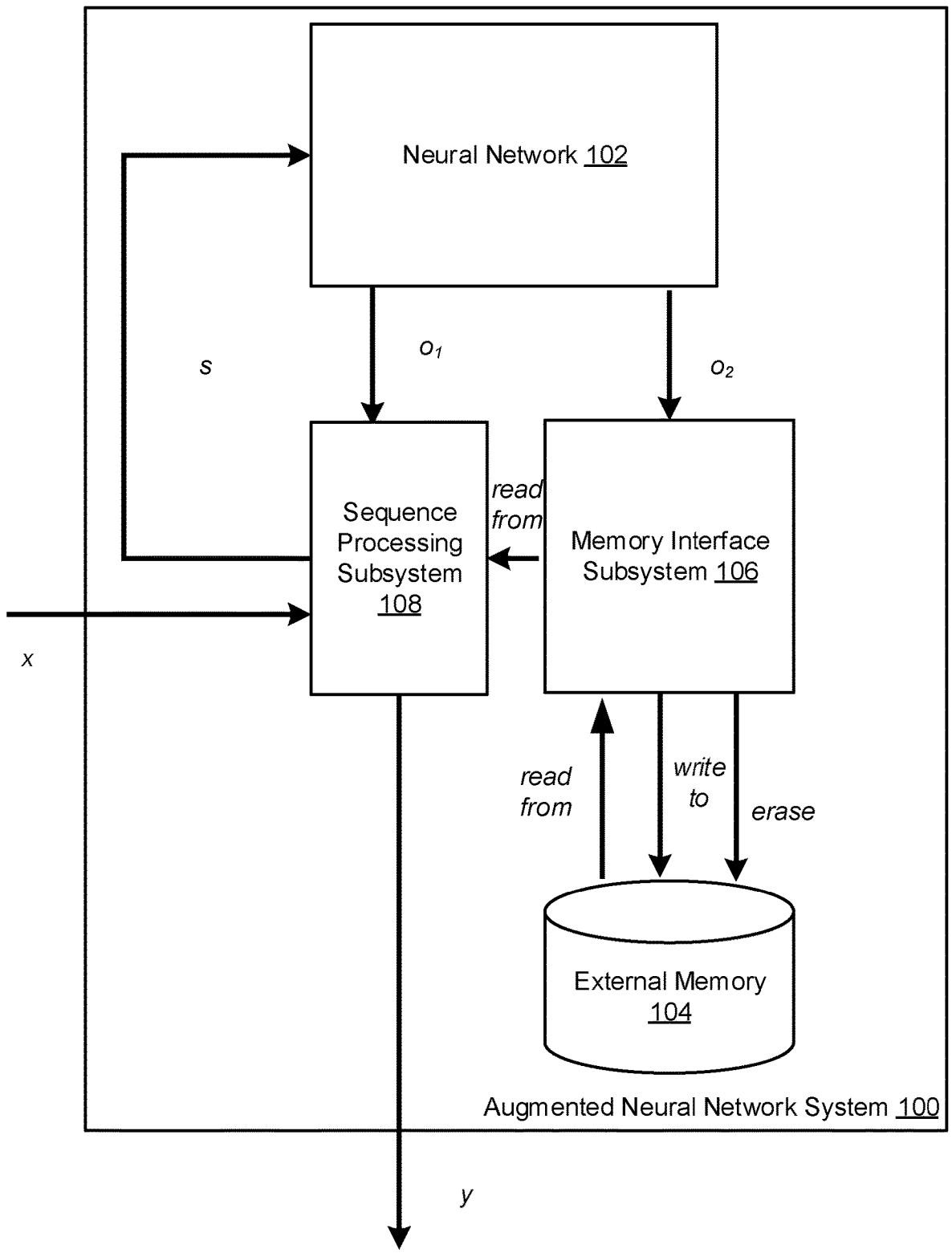
FIG. 1 shows an example augmented neural network system.

FIG. 1 shows an example augmented neural network system 100. The augmented neural network system 100 is an example of a system implemented as computer programs on one or more computers in one or more locations, in which the systems, components, and techniques described below are implemented.

The augmented neural network system 100 is a machine learning system that receives a sequence of system inputs and generates a sequence of system outputs from the system inputs. For example, the augmented neural network system 100 can receive a system input x as part of an input sequence and generate a system output y that is included in the sequence of system outputs. The augmented neural network system 100 can store the generated sequence of outputs in an output data repository or provide the sequence of outputs for use for some other immediate purpose.

The augmented neural network system 100 can be configured to receive any kind of digital data input and to generate any kind of score or classification output based on the input. For example, if the inputs to the augmented neural network system 100 are images or features that have been extracted from images, the output generated by the augmented neural network system 100 for a given image may be scores for each of a set of object categories, with each score representing an estimated likelihood that the image contains an image of an object belonging to the category. As another example, if the inputs to the augmented neural network system 100 are Internet resources (e.g., web pages), documents, or portions of documents or features extracted from Internet resources, documents, or portions of documents, the output generated by the augmented neural network system 100 for a given Internet resource, document, or portion of a document may be a score for each of a set of topics, with each score representing an estimated likelihood that the Internet resource, document, or document portion is about the topic. As another example, if the inputs to the augmented neural network system 100 are features of an impression context for a particular advertisement, the output generated by the augmented neural network system 100 may be a score that represents an estimated likelihood that the particular advertisement will be clicked on. As another example, if the inputs to the augmented neural network system 100 are features of a personalized recommendation for a user, e.g., features characterizing the context for the recommendation, e.g., features characterizing previous actions taken by the user, the output generated by the augmented neural network system 100 may be a score for each of a set of content items, with each score representing an estimated likelihood that the user will respond favorably to being recommended the content item. As another example, if the input to the augmented neural network system 100 is text in one language, the output generated by the augmented neural network system 100 may be a score for each of a set of pieces of text in another language, with each score representing an estimated likelihood that the piece of text in the other language is a proper translation of the input text into the other language. As another example, if the input to the augmented neural network system 100 is a spoken utterance, a sequence of spoken utterances, or features derived from one of the two, the output generated by the augmented neural network system 100 may be a score for each of a set of pieces of text, each score representing an estimated likelihood that the piece of text is the correct transcript for the utterance or sequence of utterances. As another example, the augmented neural network system 100 can be part of a speech synthesis system. As another example, the augmented neural network system 100 can be part of a video processing system. As another example, the augmented neural network system 100 can be part of a dialogue system. As another example, the augmented neural network system 100 can be part of an auto-completion system. As another example, the augmented neural network system 100 can be part of a text processing system. As another example, the augmented neural network system 100 can be part of a reinforcement learning system.

In particular, the augmented neural network system 100 includes a neural network 102 and a sequence processing subsystem 108. The neural network 102 may be a feedforward neural network or a recurrent neural network that is configured to receive a neural network input and process the neural network input to generate a neural network output.

The sequence processing subsystem 108 receives the system input x and generates a neural network input s from the system input x. The sequence processing subsystem 108 then causes the neural network 102 to process the neural network input s to generate a neural network output $o_1$ for the neural network input. Additionally, from each neural network input generated by the neural network 102, the sequence processing subsystem 108 determines whether to cause the neural network 102 to generate one or more additional neural network outputs for the current system input. The sequence processing subsystem 108 then determines, from each neural network output generated by the neural network 102 for the system input x, the system output y for the system input x.

That is, the sequence processing subsystem 108 determines, from neural network outputs generated by the neural network 102 for a given system input, when to generate a final system output for the given system input and to provide a neural network input generated from the next system input to the neural network for processing. Processing a system input to generate a system output is described in more detail below with reference to FIG. 2. Determining whether to cause the neural network to generate additional neural network outputs for a given system input is described in more detail below with reference to FIG. 3.

In some implementations, the neural network 102 is also augmented with an external memory 104 and a memory interface subsystem 106. In these implementations, the neural network 102 is configured to generate a neural network output that includes the output $o_1$ provided to the sequence processing system 108 and an output $o_2$ that is provided to the memory interface subsystem 106. The memory interface subsystem 106 receives the output $o_2$ generated by the neural network 102 and translates the received output into erase, read, and write operations to be performed on the external memory 104. That is, the memory interface subsystem 106 receives an output $o_2$ from the neural network 102 and, based on the output $o_2$, erases data e from the external memory 104, writes data w to the external memory 104, and reads data r from the external memory 104. The data r read by the memory interface subsystem 106 can then be provided to the sequence processing subsystem 108 for inclusion as a portion of a later neural network input, e.g., along with a system input. An augmented neural network system 102 that includes an external memory and a memory interface subsystem is described in more detail in U.S. patent application Ser. No. 62/064,965, filed Oct. 16, 2014, titled "AUGMENTING NEURAL NETWORKS WITH EXTERNAL MEMORY," the contents of which are hereby incorporated by reference herein in their entirety.

Figure 2:
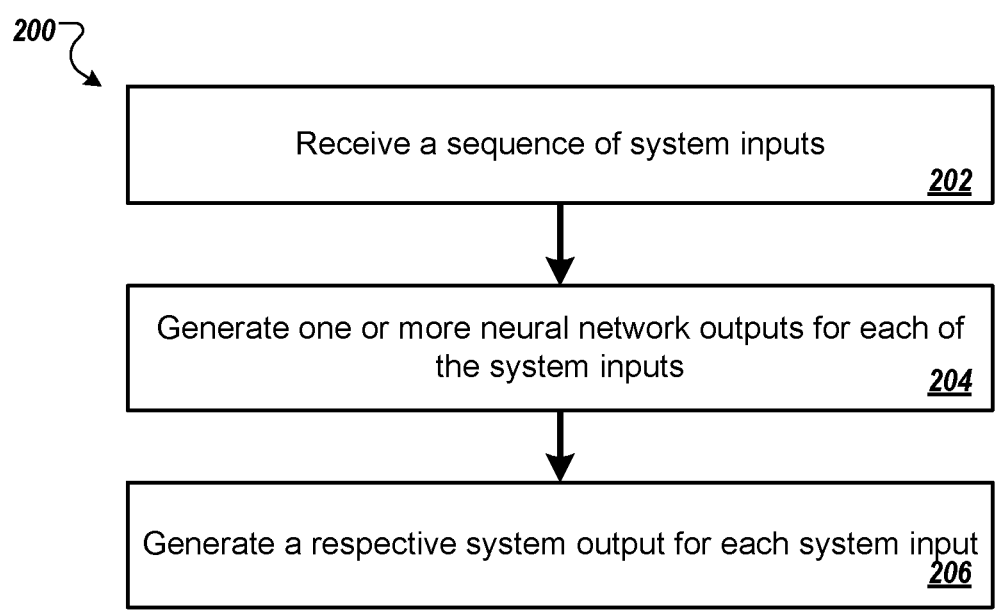
FIG. 2 is a flow diagram of an example process for generating a system output from a system input.

FIG. 2 is a flow diagram of an example process 200 for generating a system output from a system input. For convenience, the process 200 will be described as being performed by a system of one or more computers located in one or more locations. For example, an augmented neural network system, e.g., the augmented neural network system 100 of FIG. 1, appropriately programmed in accordance with this specification, can perform the process 200.

The system receives a sequence of system inputs (step 202).

The system generates one or more neural network outputs for each of the system inputs in the sequence (step 204). The system generates each of the neural network outputs by processing a respective neural network input using a neural network, e.g., the neural network 102 of FIG. 1, that is configured to process the neural network input to generate a neural network output from the neural network input.

Generally, for each system input, the system generates an initial neural network input from the system input and processes the initial neural network input using the neural network to generate an initial neural network output.

The system then determines, from a decision portion of the initial neural network output, whether another neural network output should be generated for the system input. The decision portion of the neural network output is a predetermined portion of the neural network output that has been designated, e.g., by a system administrator, as the portion of the neural network output to be used to make the determination of whether another neural network output should be generated, i.e., so that the same portion of the neural network output is used to make the determination for each output generated by the neural network. Generally, the decision portion of a given neural network output is a value at a predetermined position in the neural network output. As will be described further below, in some implementations, the neural network is configured so that the range of possible values for the decision portion is between zero and one, either inclusive or exclusive. Generating one or more neural network outputs for a system input is described in more detail below with reference to FIG. 3.

The system generates a respective system output for each system input from the neural network outputs for the system input (step 206). When only a single neural network output has been generated for a given system input, the system generates the system output for the system input from a system output portion of the single neural network output. The system output portion of the neural network output is a predetermined portion of the neural network output that is different from the decision portion and that has been designated, e.g., by a system administrator, as the portion to be used to generate the system output, i.e., so that the same portion of the neural network output is used to generate the system output for each output generated by the neural network.

In some implementations, the system provides the system output portion as the system output for the system input. In some other implementations, however, the system applies one or more transformations to the system output portion in order to generate the system output. For example, the system output portion may be transformed into a command to control a robot or a different digital interface.

When multiple neural network outputs have been generated for a given system input, the system can generate the system output for the system input in any of a variety of ways.

For example, the system can generate the system output from only the system output portion of the last neural network output that was generated for the system input. That is, the system discards all neural network outputs other than the last neural network output for the system input and then generates the system output from the last neural network output.

As another example, the system can generate the system output from the system output portions of all of the neural network outputs for the system input. In particular, the system can combine the system output portions of all of the neural network inputs to generate the system output. In some implementations, the system computes a weighted sum of the system output portions. That is, the system can multiply each system output portion by the value of the corresponding decision portion to generate a weighted system output portion and then sum the weighted system output portions to generate the system output. Optionally, the system normalizes the weighted sum, e.g., by dividing the sum by a sum of the values of the decision portions. Other ways of combining the neural network outputs to generate the system input are possible, e.g., by computing a measure of central tendency of the neural network outputs.

Figure 3:
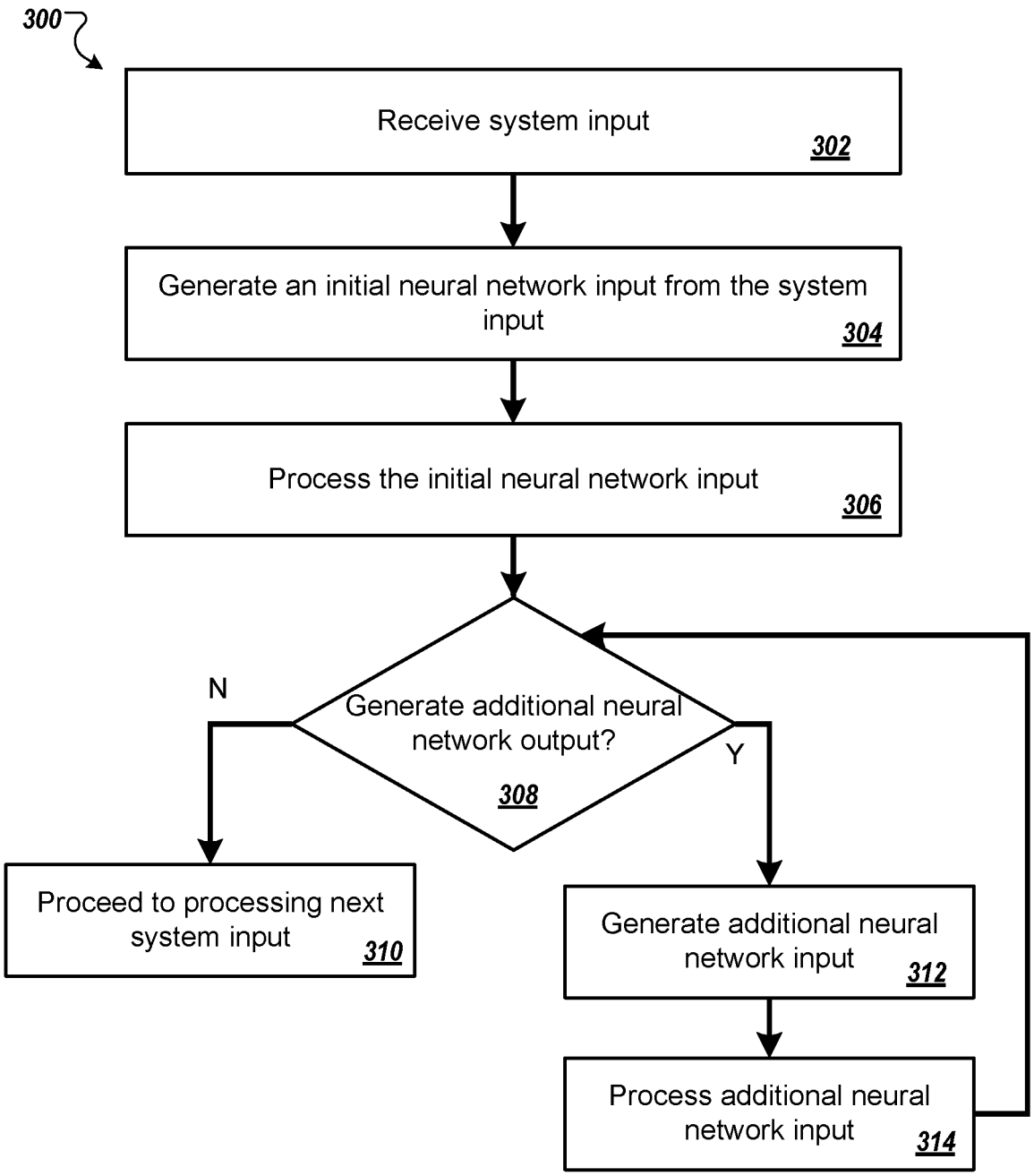
FIG. 3 is a flow diagram of an example process for generating one or more neural network outputs for a system input.

FIG. 3 is a flow diagram of an example process 300 for generating one or more neural network outputs from a system input. For convenience, the process 300 will be described as being performed by a system of one or more computers located in one or more locations. For example, an augmented neural network system, e.g., the augmented neural network system 100 of FIG. 1, appropriately programmed in accordance with this specification, can perform the process 300.

The system receives a system input (step 302). The system input is one input of a sequence of system inputs received by the system.

The system generates an initial neural network input from the system input (step 304). In implementations where the neural network is not augmented with an external memory, the system can provide the system input as the initial neural network input. In implementations where the neural network is augmented with an external memory, the system can combine, e.g., concatenate, the current read vector or vectors that have been read from the external memory by the memory interface subsystem with the system input to generate the initial neural network input.

The system processes the initial neural network input using the neural network to generate an initial neural network output from the system input (step 306). Depending on the implementation, the neural network can either be a feed-forward neural network, e.g., a convolutional neural network or another kind of deep feed-forward neural network, or a recurrent neural network, e.g., an LSTM neural network. If the neural network is a recurrent neural network, the recurrent neural network also uses the internal state of the recurrent neural network from the preceding neural network input processed by the neural network in processing the current neural network input to generate the neural network output. In some implementations, the neural network includes both recurrent and feed-forward layers.

In implementations where the neural network is augmented with an external memory, the system also reads, writes, and erases from the external memory in accordance with designated portions of the neural network output. Reading, writing, and erasing from the external memory is described in more detail in U.S. patent application Ser. No. 62/064,965, filed Oct. 16, 2014, titled "AUGMENTING NEURAL NETWORKS WITH EXTERNAL MEMORY," the contents of which are hereby incorporated by reference herein in their entirety.

The system determines, from the decision portion of the neural network output, whether or not to generate an additional neural network output for the system input (step 308). The system can make this determination from the decision portion of the neural network output in any of a variety of ways.

For example, the system can determine whether the value of the decision portion of the neural network output exceeds a threshold value and, if the value of the decision portion exceeds the threshold value, determine that no more additional neural network outputs should be generated for the system input.

As another example, the value of the decision portion may be configured to be constrained to a range between zero and one, either inclusive or exclusive. In this example, the system can treat the value of the decision portion as a probability. That is, the system can determine not to generate any more additional neural network outputs with a probability equal to the value of the decision portion and determine to generate an additional neural network output with a probability equal to one minus the value of the decision portion. If the value is not constrained to the range, the system can normalize the value and treat the normalized value as a probability.

If the system determines not to generate any more additional neural network outputs, the system proceeds to processing the next system input in the sequence (step 310). If the system input is the last system input in the sequence, the system outputs the generated sequence of system outputs for use for some immediate purpose or stores the sequence of outputs in an output data repository.

If the system determines to generate an additional neural network output, the system generates an additional neural network input (step 312). In implementations where the neural network is not augmented with an external memory, the system can again provide the system input as the additional neural network input. Alternatively, the system can provide a default input, e.g., an input vector of predetermined default values, as the additional neural network input.

In implementations where the neural network is augmented with an external memory, the system can combine the current read vector that has been read from the external memory, e.g., based on reading from the external memory in accordance with a read portion of the current neural network output, with the system input or the default input.

The system processes the additional neural network input using the neural network to generate an additional neural network output (step 314). Because the state of the neural network will generally be different when processing each additional neural network input than the state of the neural network when processing the initial neural network input or when processing each other additional neural network input, each additional neural network output will generally differ from each other additional neural network output and the initial neural network output. For example, in implementations where the neural network is augmented with an external memory, the current read vector being provided to the neural network as part of each neural network input will generally be different. As another example, when the neural network includes one or more recurrent layers, the internal state of the neural network when processing each of the neural network inputs will generally be different.

The system determines, from the decision portion of the neural network output, whether or not to generate an additional neural network output for the system input (returning to step 308).

In some implementations, the augmented neural network system can include multiple neural networks that each process each system input to generate a respective neural network output, with the appropriate portions of the neural network outputs generated by each network being combined to generate the system output for the system input. In these cases, the system can determine whether or not to generate an additional neural network output for the system input from the decision portions of each of the neural network inputs, e.g., by computing a measure of central tendency of the decision portions and then making the determination from the measure as described above.

The processes 200 and 300 can be performed for each system input in a sequence of system inputs to generate a sequence of system outputs for the sequence of system inputs. The sequence of system inputs can be a sequence for which the desired output, i.e., the output sequence that should be generated by the system for the input sequence, is not known. The system can also perform the processes 200 and 300 on inputs in a set of training data, i.e., a set of inputs for which the output that should be predicted by the system is known, in order to train the system, i.e., to determine trained values for the parameters of the neural network and, in implementations where the neural network is augmented with an external memory, any additional parameters of processes used in erasing, writing, and reading from the external memory. In implementations where the components of the system are entirely differentiable, e.g., when the system decides whether or not to generate an additional neural network input by treating the decision portion as a probability, the processes 200 and 300 can be performed repeatedly on inputs selected from a set of training data as part of a conventional machine learning training technique to train the neural network, e.g., a stochastic gradient descent with back propagation through time training technique if the neural network is a recurrent neural network.

In some implementations, the objective function that is being optimized includes, in addition to one or more terms that penalize the system for generating incorrect system outputs, one or more terms that penalize the system for spending too much time processing in order to generate a system output. That is, the objective function includes one or more terms that increase the penalty for the system the more time the system takes to generate an output sequence for a given input sequence. The time can be measured, e.g., in terms of number of neural network outputs generated in processing the input sequence. Thus, by training the system using an objective function that offsets the penalty for incorrect system outputs with a penalty for spending too much time processing, the neural network can be trained not to generate excessive additional neural network outputs for any given system input, thereby reducing the increase in processing time and computing resources required for the system to process a given input sequence.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing a sequence of system inputs to generate a sequence of system outputs, the method comprising:

receiving a first system input from the sequence of system inputs;

generating a first initial neural network input from at least the first system input;

providing the first initial neural network input as input to a neural network;

receiving, as output from the neural network, a first initial neural network output for the first system input, wherein the first initial neural network output comprises (i) decision portion that corresponds to a portion of the neural network output to be used to make a determination of whether another neural network output is required to be generated and (ii) a system output portion that is different from the decision portion and that corresponds to a portion of the neural network output to be used to generate a system output;

determining, from the decision portion of the first initial neural network output for the first system input, that another neural network output is required to be generated for the first system input; and in response to determining that another neural network output is required to be generated for the first system input:

generating a first additional neural network input from at least the first system input;

providing the first additional neural network input as input to the neural network; and receiving, as output from the neural network, a first additional neural network output for the first system input.

2. The method of claim 1, further comprising:

receiving a second system input from the sequence of system inputs;

generating a second initial neural network input from at least the second system input;

providing the second initial neural network input as input to the neural network;

receiving, as output from the neural network, a second initial neural network output for the second system input, wherein the second initial neural network output comprises a decision portion and a system output portion;

determining, from the decision portion of the second initial neural network output for the second system input, that no other neural network outputs is required to be generated for the second system input; and in response to determining that no other neural network outputs is required to be generated for the second system input, generating a system output for the second system input from the system output portion of the second initial neural network output for the second system input.

3. The method of claim 1, further comprising:

determining, from the decision portion of the first additional neural network output for the first system input, whether any further additional neural network outputs is required to be generated for the first system input.

4. The method of claim 3, further comprising:

in response to determining that no further additional neural network output is required to be generated for the first system input, generating a system output for the first system input from the system output portion of the first additional neural network output generated by the neural network for the first system input.

5. The method of claim 3, further comprising:

in response to determining that no further additional neural network output is required to be generated for the first system input, generating a system output for the first system input from the system output portions of the first initial neural network output and the first additional neural network output.

6. The method of claim 5, wherein generating a system output comprises:

determining a respective weight for the first initial neural network output and for the first additional neural network output from the decision portions of the first initial neural network output and the first additional neural network output; and combining the system output portions of the first initial neural network output and the first additional neural network output in accordance with the respective weights.

7. The method of claim 1, wherein determining, from the decision portion of the first initial neural network output for the first system input, that another neural network output is required to be generated for the first system input comprises:

determining a probability from the decision portion of the first initial neural network output, wherein the probability is associated with a likelihood that another neural network output is required to be generated; and determining that another neural network output is required to be generated based on the probability.

8. The method of claim 2, wherein determining, from the decision portion of the second initial neural network output for the second system input, that no other neural network outputs is required to be generated for the second system input comprises:

determining whether or not the decision portion of the second initial neural network output exceeds a threshold value; and determining that no other neural network outputs is required to be generated when the decision portion of the second initial neural network output exceeds the threshold value.

9. One or more non-transitory computer storage media encoded with a computer program, the computer program comprising instructions that when executed by one or more computers cause the one or more computers to perform operations for processing a sequence of system inputs to generate a sequence of system outputs, the operations comprising:

receiving a first system input from a sequence of system inputs;

generating a first initial neural network input from at least the first system input;

providing the first initial neural network input as input to a neural network;

receiving, as output from the neural network, a first initial neural network output for the first system input, wherein the first initial neural network output comprises (i) a decision portion that corresponds to a portion of the neural network output to be used to make a determination of whether another neural network output is required to be generated and (ii) a system output portion that is different from the decision portion and that corresponds to a portion of the neural network output to be used to generate a system output;

determining, from the decision portion of the first initial neural network output for the first system input, that another neural network output is required to be generated for the first system input; and in response to determining that another neural network output is required to be generated for the first system input:

generating a first additional neural network input from at least the first system input;

providing the first additional neural network input as input to the neural network; and receiving, as output from the neural network, a first additional neural network output for the first system input.

10. The media of claim 9, wherein the operations further comprise:

receiving a second system input from the sequence of system inputs;

generating a second initial neural network input from at least the second system input;

providing the second initial neural network input as input to the neural network;

receiving, as output from the neural network, a second initial neural network output for the second system input, wherein the second initial neural network output comprises a decision portion and a system output portion;

determining, from the decision portion of the second initial neural network output for the second system input, that no other neural network outputs is required to be generated for the second system input; and in response to determining that no other neural network outputs is required to be generated for the second system input, generating a system output for the second system input from the system output portion of the second initial neural network output for the second system input.

11. The media of claim 9, wherein the operations further comprise:

determining, from the decision portion of the first additional neural network output for the first system input, whether any further additional neural network outputs is required to be generated for the first system input.

12. The media of claim 11, wherein the operations further comprise:

in response to determining that no further additional neural network output is required to be generated for the first system input, generating a system output for the first system input from the system output portion of the first additional neural network output generated by the neural network for the first system input.

13. The media of claim 11, wherein the operations further comprise:

in response to determining that no further additional neural network output is required to be generated for the first system input, generating a system output for the first system input from the system output portions of the first initial neural network output and the first additional neural network output.

14. The media of claim 12, wherein generating a system output comprises:

determining a respective weight for the first initial neural network output and for the first additional neural network output from the decision portions of the first initial neural network output and the first additional neural network output; and combining the system output portions of the first initial neural network output and the first additional neural network output in accordance with the respective weights.

15. The media of claim 9, wherein determining, from the decision portion of the first initial neural network output for the first system input, that another neural network output is required to be generated for the first system input comprises:

determining a probability from the decision portion of the first initial neural network output, wherein the probability is associated with a likelihood that another neural network output is required to be generated; and determining that another neural network output is required to be generated based on the probability.

16. The media of claim 10, wherein determining, from the decision portion of the second initial neural network output for the second system input, that no other neural network outputs is required to be generated for the second system input comprises:

determining whether or not the decision portion of the second initial neural network output exceeds a threshold value; and determining that no other neural network outputs is required to be generated when the decision portion of the second initial neural network output exceeds the threshold value.

17. A system comprising:

one or more computers; and one or more storage devices storing instructions that, when executed by the one or more computers, cause the one or more computers to perform operations for processing a sequence of system inputs to generate a sequence of system outputs, the operations comprising:

receiving a first system input from a sequence of system inputs;

generating a first initial neural network input from at least the first system input;

providing the first initial neural network input as input to a neural network;

receiving, as output from the neural network, a first initial neural network output for the first system input, wherein the first initial neural network output comprises (i) a decision portion that corresponds to a portion of the neural network output to be used to make a determination of whether another neural network output is required to be generated and (ii) a system output portion that is different from the decision portion and that corresponds to a portion of the neural network output to be used to generate a system output;

determining, from the decision portion of the first initial neural network output for the first system input, that another neural network output is required to be generated for the first system input; and in response to determining that another neural network output is required to be generated for the first system input:

generating a first additional neural network input from at least the first system input;

providing the first additional neural network input as input to the neural network; and receiving, as output from the neural network, a first additional neural network output for the first system input.

18. The system of claim 17, wherein the operations further comprise:

receiving a second system input from the sequence of system inputs;

generating a second initial neural network input from at least the second system input;

providing the second initial neural network input as input to the neural network;

receiving, as output from the neural network, a second initial neural network output for the second system input, wherein the second initial neural network output comprises a decision portion and a system output portion;

determining, from the decision portion of the second initial neural network output for the second system input, that no other neural network outputs is required to be generated for the second system input; and in response to determining that no other neural network outputs is required to be generated for the second system input, generating a system output for the second system input from the system output portion of the second initial neural network output for the second system input.

19. The system of claim 17, wherein the operations further comprise:

determining, from the decision portion of the first additional neural network output for the first system input, whether any further additional neural network outputs is required to be generated for the first system input.

20. The system of claim 19, wherein the operations further comprise:

in response to determining that no further additional neural network output is required to be generated for the first system input, generating a system output for the first system input from the system output portion of the first additional neural network output generated by the neural network for the first system input.

21. The system of claim 19, wherein the operations further comprise:

in response to determining that no further additional neural network output is required to be generated for the first system input, generating a system output for the first system input from the system output portions of the first initial neural network output and the first additional neural network output.

22. The system of claim 20, wherein generating a system output comprises:

determining a respective weight for the first initial neural network output and for the first additional neural network output from the decision portions of the first initial neural network output and the first additional neural network output; and combining the system output portions of the first initial neural network output and the first additional neural network output in accordance with the respective weights.

23. The system of claim 17, wherein determining, from the decision portion of the first initial neural network output for the first system input, that another neural network output is required to be generated for the first system input comprises:

determining a probability from the decision portion of the first initial neural network output, wherein the probability is associated with a likelihood that another neural network output is required to be generated; and determining that another neural network output is required to be generated based on the probability.

24. The system of claim 18, wherein determining, from the decision portion of the second initial neural network output for the second system input, that no other neural network outputs is required to be generated for the second system input comprises:

determining whether or not the decision portion of the second initial neural network output exceeds a threshold value; and determining that no other neural network outputs is required to be generated when the decision portion of the second initial neural network output exceeds the threshold value.

\* \* \* \* \*